Dec. 27, 1960 J. R. PADRICK 2,966,217
TRAILING TYPE TRACTOR MOUNTED IMPLEMENTS
Filed April 6, 1955 3 Sheets-Sheet 1
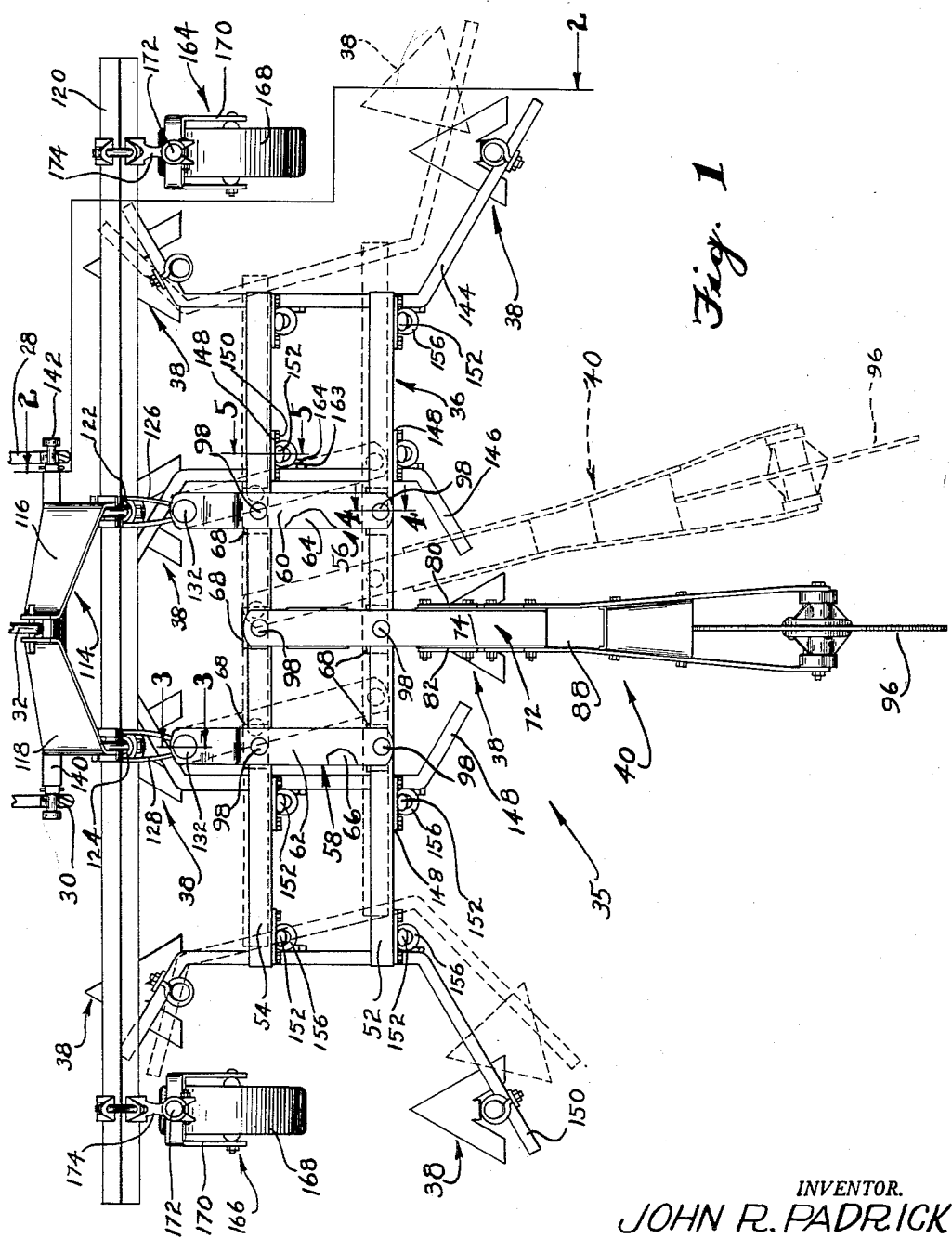
INVENTOR.
JOHN R. PADRICK
BY
Emerson B Donnell
ATTORNEY

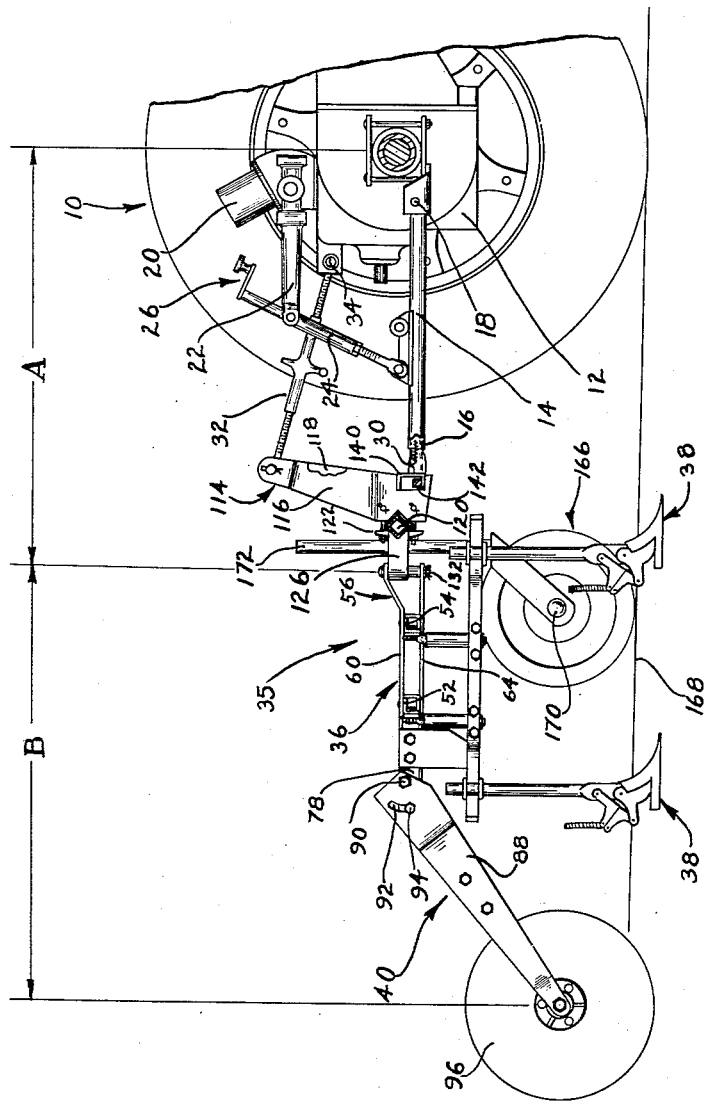

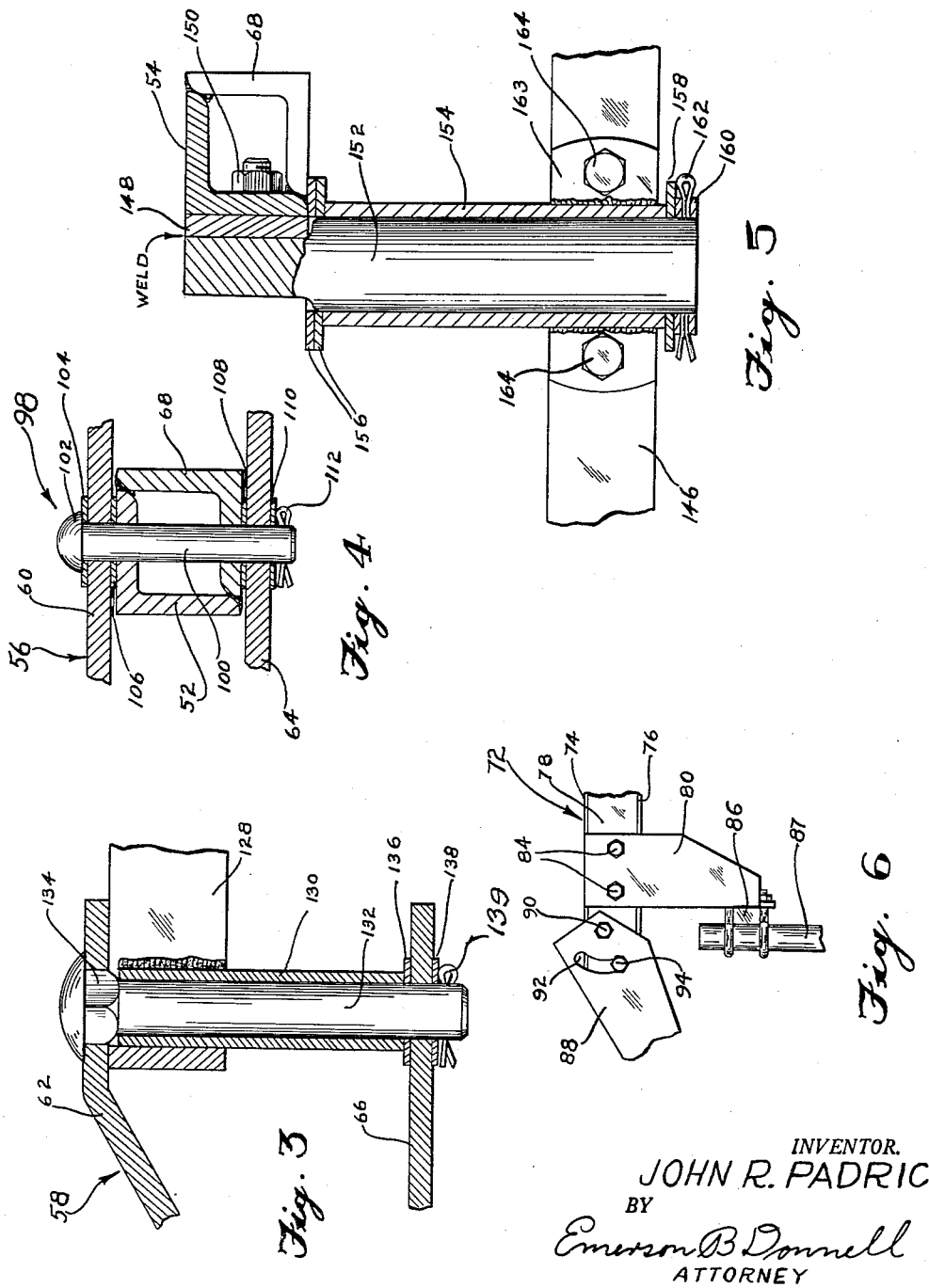

United States Patent Office 2,966,217
Patented Dec. 27, 1960

2,966,217

TRAILING TYPE TRACTOR MOUNTED IMPLEMENTS

John R. Padrick, Anniston, Ala., assignor to J. I. Case Company, Racine, Wis., a corporation of Wisconsin Filed Apr. 6, 1955, Ser. No. 499,660

2 Claims. (Cl. 172—137)

The present invention relates to trailing type tractor mounted cultivators or similar ground working tools, and an object thereof is to generally improve the construction and operation of devices of this type.

A further object is to provide such an implement which is easily attached to and detached from a tractor, and which can be propelled or drawn by the tractor and guided as to its general path of progress, as well as lifted clear of the ground from time to time as required by the conditions of operation. A further object is to provide in such an implement a desired amount of freedom so that the implement may, to a certain extent, find its own path of travel and do accurate work in spite of unevenness of the ground, or when the implement is traveling in a curved path.

Cultivators designed to follow a tractor are well known but have certain serious faults. This is particularly true of those cultivators which are used in connection with contour farming where the rows are planted in sweeping curves in accordance with the contour of the land so that the actual furrows or crop rows are substantially horizontal, and therefore discourage gulleying or washing away of the soil. Presently available cultivators that are flexibly mounted behind the tractor have a tendency to "cut in" laterally on the path of the tractor so as to travel at a shorter radius than that at which the tractor is traveling. On the other hand, if the cultivator is mounted so as to be laterally fixed or rigid with respect to the tractor, it will "cut out" of the path of the tractor and travel at a longer radius than the tractor. In either case if the tractor is steered accurately between the rows, the cultivator will not necessarily follow accurately between the rows but may damage or uproot the plants in the rows instead of the weeds between the rows as intended.

Accordingly, it is a further and a major object of this invention to provide a cultivator which will travel behind the tractor with such a degree of accuracy that the shovels will travel between the plant rows regardless of the amount of turning of the tractor (within the limits usually found in contour farming) thus greatly facilitating this highly desirable procedure.

A further object is to provide a construction including a jointed type of frame, a steering or rudder-type coulter for controlling the frame, and expedients including joints or pivot bearings for the frame which will make possible the action of the steering coulter.

A further object is to provide a hitch which will lift and guide the implement while at the same time it provides sufficient freedom to allow for rocking of the implement with respect to the tractor.

Further objects and advantages will appear from the following description and accompanying drawings in which an illustrative embodiment is shown, but it is to be understood that the invention is not to be taken as limited to the embodiment disclosed, or in fact, in any manner except as defined in the claims.

Referring to the drawings, Fig. 1 is a plan view of a cultivator embracing this invention and including a fragmentary portion of the connecting means to the tractor, with the position of the tools when cultivating on a radius, shown by dotted lines.

Fig. 2 is a fragmentary side elevational view on a smaller scale, of the right side of the rear end of a tractor to which this invention is attached and taken at a section along the line 2—2 of Fig. 1.

Fig. 3 is an enlarged vertical fragmentary view with parts broken away and taken in a plane at 3—3 of Fig. 1.

Fig. 4 is an enlarged vertical fragmentary section taken in a plane at 4—4 of Fig. 1.

Fig. 5 is an enlarged vertical fragmentary section taken in a plane at 5—5 of Fig. 1.

Fig. 6 is a slightly enlarged right side elevational fragmentary view of a portion of Fig. 2 showing the coulter wheel mounting, and adjoining details.

Referring to Fig. 2, a tractor 10 in this instance is provided with a rear axle housing 12 to which a pair of rearwardly extending laterally-rigid draft arms 14 and 16 are pivotally mounted for vertical swinging on transverse pivots 18, only one pivot 18 being shown. Arms 14 and 16 are raised and lowered hydraulically by a ram 20 which actuates a lift arm 22. A similar lift arm is provided for draft arm 16 which is identical to arm 22 and need not be shown. A lift link 24 connects arm 14 with lift arm 22 and a crank-and-thread arrangement 26 is employed in order to adjust the relative vertical position of arms 14 and 16. The purpose of this last mentioned adjustment is to permit transverse leveling of the cultivator.

Draft arms 14 and 16 are provided with claws 28 and 30 as shown in Figs. 1 and 2. These claws are of a well-known design and permit attaching and releasing of the implement from the tractor. These claws form the subject matter of the patent to Seeburger, No. 2,681,813, and issued June 22, 1954, for Hitch for Tractor Mounted Implements. A depth control or upper link 32 is pivoted to the tractor at 34 and spaced above arms 14 and 16. This link 32 is pivoted in a manner so as to be free to swing laterally as well as vertically. Generally, the subject of this application is the cultivator referred to as 35, comprising a frame 36, a plurality of cultivator shovels 38, and a rearwardly-mounted trailing ground engaging element or coulter guide wheel assembly 40. Frame 36 comprises a pair of transverse mutually-parallel angle members 52 and 54. These members comprise the main frame portions of the cultivator frame 36. Frame members 52 and 54 are spaced apart a suitable distance in the direction of travel and are pivotally connected to rearwardly-extending laterally-spaced draft links 56 and 58 so as to permit transverse pivotal movement relative to the tractor and to each other, the lateral movement being indicated by dotted lines in Fig. 1. Links 56 and 58 comprise upper members 60 and 62 and lower members 64 and 66. Links 56 and 58 extend forwardly a suitable distance from angle member 54 for reasons that will appear in the description.

A plurality of relatively short reinforcing angle members 68, shown in Figs. 1, 2 and 4 are welded or otherwise secured to the angle members 52 and 54 in relation to form short boxlike sections so as to provide adequate support for pivot pins to be later described.

A coulter wheel arm link 72 is pivoted to angle members 52 and 54 in the present instance at a position intermediate links 56 and 58 and parallel thereto. Link 72 comprises upper and lower bifurcated members 74 and 76 Fig. 6, which terminate rearwardly in a box sections 78, and which section comprises the rearward end of arm link 72, the latter extending rearwardly a suitable distance beyond angle member 52. Box section 78 provides the necessary rigidity for mounting a shovel 38 at a point spaced at a suitable distance below the box section 78. Plates 80 and 82 are positioned one on either side of box section 78 and extend downwardly as shown in Fig. 6. A pair of bolts 84 is passed horizontally through plates 80 and 82 and box section 78. A transverse bar 86 is welded or otherwise secured to the rear edges of plates 80 and 82 and the shank 87 for said shovel 38 is clamped in a conventional manner thereto.

A coulter fork 88 is bifurcated as shown in Fig. 1 and is pivoted for up-and-down swinging movement at its forward end to box section 78 by a bolt 90 which passes through the bifurcations of fork 88 and through box section 78. Arcuate slots 92 are provided in the bifurcations of fork 88, and a bolt 94 extending through the slots and box section 78 may be utilized to clamp fork 88 in any desired angular position within the limits of the length of the arcuate slot 92. A conventional coulter wheel 96 is pivotally mounted in fork 88 as shown in Figs. 1 and 2 so as to roll freely when engaging the soil, although other expedients are contemplated as within the scope of the invention, the device being provided for the purpose of sensing, from contact with the ground, the path of travel of the implement relatively to the ground, as determined by the path of the tractor, and adjusting the implement as will appear, to trail in proper relation thereto.

Links 56, 58, and 72 are all similarly pivoted to angle members 52 and 54 in parallel spaced relationship, as clearly shown in Fig. 1.

A typical pivot 98 employed to pivot links 56, 58 and 72 in angle members 52 and 54 is shown in Figs. 1, 2 and 4. This pivot 98 comprises a vertical pivot pin 100 having a head 102. Pin 100 is passed through each of suitable holes in the upper members 60, 62 and 74, and lower members 64, 66 and 76 of links 56, 58 and 72 respectively. Pins 100 also pass through angle members 52 and 54 and the reinforcing angle portions 68 so as to provide adequate bearing support for the frame 35. Washers 104, 106, 108 and 110 serve to reduce friction, and cotters 112 prevent axial displacement of pins 100. This arrangement permits transverse distortion or swinging of frame 35 as shown by dotted lines in Fig. 1, while maintaining angle members 52 and 54, and links 56, 58 and 72 mutually parallel. The description of the cultivator proper will be continued after the details of the draft arrangement are described.

Referring to Figs. 1 and 2, a mast 114 is provided having bifurcated transversely positioned members 116 and 118 having their lower ends, in the present instance, in transverse alignment with links 56 and 58. A transversely-extended tool bar 120 is clamped in notches on the rearward edges of members 116 and 118 by clamps 122 and 124. Clamps 122 and 124 have integral therewith rearwardly extending strap members 126 and 128 shown in Figs. 1, 2 and 3 which straps have rearwardly directed loops. The description of this portion of the cultivator will be confined to details concerning one of the straps 126 and 128 as both are identical. A sleeve 130 having a vertical pivot is welded within loop 128 and shown in Fig. 3. Sleeve 130 comprises the bearing sleeve for a pivot pin 132. Upper member 62 rests on the upper surface of strap member 128 and is provided with a square hole to accommodate a square portion 134 of pin 132, so that the pin will not turn relatively to link 58. Thus, the sleeve will comprise a bearing of a suitable length for pin 132. Sleeve 130 is spaced down from the upper surface of loop 128 so as not to interfere with square portion 134. A washer 136 provides a bearing surface at the lower end of sleeve 130, thereby preventing wear of lower member 66 because of pivoting movement relative to the sleeve 130. It is obvious that when excessive wear of washer 136 has taken place, it can be replaced. A washer 138 is employed to separate cotter pin 139 from lower member 66.

A transverse channel member 140 is welded or otherwise secured at the front edges of members 116 and 118 of mast 114 as shown in Figs. 1 and 2. A transverse pull bar 142 is positioned in channel 140 and extends from both ends thereof a suitable distance. Bar 142 is of such dimensions as to freely move up and down in channel 140. The ends of bar 142 are provided with cylindrical portions of a reduced diameter so as to accommodate claws 28 and 30. This arrangement permits the cultivator to be securely gripped by the claws 28 and 30 and to also float relative to the channel 140 which latter is held rigidly relative to the implement.

The cultivator shovels 38 are carried on a plurality of mounting bars 144, 146, 148 and 150. These bars lie in a plane at a substantial distance below angle members 52 and 54 and are supported therefrom by the arrangement shown in Figs. 1, 2 and 5. The description will be limited to a single mounting bar 146 and indicated in plane 5—5 of Fig. 1 because the mounting bars are all similar.

A plate 148 is bolted to angle member 54 by a pair of bolts 150. A vertical swivel stud 152 is provided having a flattened portion at its upper end and which portion is welded to plate 148 as shown in Fig. 5. A sleeve 154 provides a bearing for stud 152. A pair of thrust washers 156 and a washer 158 serve to take thrust forces by acting in an axial direction. A collar 160 and a cotter pin 162 complete the stud assembly. A plate 163 is welded to the sleeve 154 substantially at a right angle to plate 148 and positioned on horizontal bar 146. Bolts 164 pass through plate 163 and mounting bar 146. This arrangement forms a rigid supporting means for the mounting bars and the cultivators to be attached to the mounting bar 146.

It is to be noted that the fore-and-aft center distance or spacing of the pivots 98—98 is the same as that of pivotal connections 152—152 and that links 60, 62 and 72, and also mounting bars (at least the portions thereof extending between connections 152—152) are parallel, as also are angle members 52 and 54. Therefore it is possible for the resulting frame-like structure to distort from the rectangular configuration shown in full lines in Fig. 1 to the shape of a parallelogram as suggested in dotted lines, the degree of such distortion being variable, and determined by the amount of turning of the tractor. As a result of the stated relations of the pivots, elements and links, such distortion is effected without any binding in the pivots or springing of the elements.

Ground engaging wheel units 164 and 166 are secured to tool bar 120, one unit being mounted preferably adjacent each end of the bar. Each of these units comprises a rubber-tired gauge wheel 168 mounted on a fork 170 which has a vertical shank 172 secured thereto and clamped to the tool bar 120 by a clamp 174. This arrangement permits the gauge wheels to be adjusted either up or down relative to the shovels 38, thereby regulating the depth at which the latter penetrate the earth.

Figs. 1 and 2 indicate how the present invention embraces a novel means of obtaining a substantially true trail of the cultivator with relation to the tractor. This arrangement is especially important when operating on a curve such as is done in contour farming so as to avoid injury to plants by lateral drifting of the shovels. Referring to Fig. 2, the object is accomplished by properly proportioning distances A and B so that they are substantially equal.

It is of course well-known that the usual trailing implement hitched behind a tractor on a pivot close to the rear axle will "cut in" on the path of the tractor when the latter turns. In other words, the tractor traveling on a circumference passing through the center of the rear axle will curve at a predetermined radius about an imaginary point at the center of the circumference, whereas the implement will swing toward the inside of the curve, more or less according to the sharpness of the curve, so as to travel at a shorter radius, in a relatively sharper turn as much as a foot or more. If the implement is a cultivator this of source is a serious matter since, if the tractor is guided accurately between the curved rows of the crop the implement will swing out of line sufficiently to uproot the young plants. If on the other hand the implement is hitched rigidly to the tractor rearwardly of the rear axle a similar condition exists except that the implement will "cut out" on the curve, swinging for example to the left as the tractor turns to the right, with the same disastrous results of course to the young crop.

In the present instance the links 14 and 16 as hereinbefore stated constitute a laterally rigid rearwardly extending structure on the tractor and of course will swing to the left as the tractor turns to the right and vice-versa. The structure described results in leading the trailing cultivator elements from the rear of this laterally rigid structure, namely from pivots 132—132, which prevents the above mentioned "cutting in" effect. Ground engaging element or coulter wheel 96 however is not laterally rigid but may swing from side to side, tending to find a true rolling path behind the implement such as a rudder would do if unattended. Such swinging of element 96 distorts frame 36 and thereby positions shovels 38—38 in a position which might be said to be a compromise between that which they would take if trailed behind the tractor and that which would result if they were mounted rigidly behind the tractor. By making dimension B substantially equal to dimension A the positions of the shovels become substantially the same in relation to the crop rows when the tractor turns as they were when the tractor was proceeding in a straight path. Thus the device is well adapted for contour farming where the crops are planted in long sweeping curves, since cultivation can be accomplished without the danger of destroying the young crops.

The above being a complete disclosure of an illustrative embodiment of the invention, what is claimed as new and desired to be secured by Letters Patent of the United States is:

1. A tractor and ground working tool assembly including a tractor having a rear axle and supporting a laterally rigid structure projecting rearwardly therefrom, a tool supporting frame structure comprising a parallelogram having substantially horizontal longitudinal, and transverse pivotally interconnected members to permit distortion of said frame, laterally spaced pivot means interconnecting the laterally rigid structure and said frame structure rearwardly of said rear axle, a ground engaging element rearwardly of the frame and pivotally connected to one of said transverse members for distorting the frame when it is swung from side to side by the turning of the tractor, and a plurality of ground working tools each pivotally connected to one of said frame members and disposed in a predetermined trailing position in relation to the tractor so as to be shiftable by distortion of said frame, said ground working tools being spaced backwardly from said laterally spaced pivot means sufficiently to be laterally displaced by the distortion of said frame to a different relation to said tractor for trailing said tractor in a curved path in a position equivalent to said predetermined position when said frame is distorted by the swinging of said ground engaging element by reason of the turning of said tractor.

2. A tractor and ground working tool assembly including a laterally rigid structure assembly secured to the tractor and disposed rearwardly of the rear axle of the tractor, a tool supporting frame made of pivotally interconnected substantially horizontal longitudinal and transverse members to permit distortion of said frame, pivot means interconnecting said laterally rigid structure and said frame rearwardly of said rear axle, a ground engaging element pivotally connected to one of said frame members on the side of said frame opposite from the tractor axle, whereby the frame will be distorted when the ground engaging element is swung from side to side by the turning of the tractor, a plurality of ground working tools each pivotally connected to one of said frame members and disposed in a predetermined trailing position in relation to the tractor so as to be shiftable by distortion of said frame when the tractor turns, the relationship between the tractor and the ground engaging element being such as to have the ground working tools trailing the tractor in a curved path in a position similar to said predetermined position to provide for accurate trailing of the tool members.

References Cited in the file of this patent

UNITED STATES PATENTS

| | | |
|---|---|---|
| 846,156 | Stamps | Mar. 5, 1907 |
| 1,767,910 | Anderson | June 24, 1930 |
| 2,551,451 | Morkoski | May 1, 1951 |
| 2,575,801 | Evans | Nov. 20, 1951 |
| 2,583,897 | Smeds | Jan. 29, 1952 |
| 2,690,110 | Crouch et al. | Sept. 28, 1954 |
| 2,697,393 | Gardner | Dec. 21, 1954 |